United States Patent [19]
Wilson

[11] Patent Number: 5,823,143
[45] Date of Patent: Oct. 20, 1998

[54] NEWBORN ANIMAL INCUBATOR FOR USE IN CONJUNCTION WITH AN AUTOMOBILE

[76] Inventor: Jerry A. Wilson, P.O. Box 261, Malta, Mont. 59538

[21] Appl. No.: 879,505

[22] Filed: Jun. 20, 1997

Related U.S. Application Data

[60] Provisional application No. 60/020,605 Jun. 26, 1996.

[51] Int. Cl.[6] .................................................. A01K 29/00
[52] U.S. Cl. .......................................... 119/312; 119/303
[58] Field of Search ..................................... 119/312, 313, 119/303, 306, 315, 318, 314, 317, 319, 285, 606; 237/678

[56] References Cited

U.S. PATENT DOCUMENTS

| | | | |
|---|---|---|---|
| 2,566,453 | 9/1951 | Ketay | 119/318 |
| 4,559,903 | 12/1985 | Bloom et al. | 119/606 X |
| 4,606,299 | 8/1986 | Grumbach | 119/314 X |
| 4,637,343 | 1/1987 | Beck et al. | 119/303 |
| 4,671,284 | 6/1987 | Wilson et al. | 119/315 X |
| 5,012,763 | 5/1991 | Morrison | 119/303 X |
| 5,140,947 | 8/1992 | Bruce | 119/725 X |
| 5,542,375 | 8/1996 | Voren | 119/312 |

*Primary Examiner*—Jack W. Lavinder
*Assistant Examiner*—Yvonne R. Abbott

[57] ABSTRACT

An incubator taken directly into the field where birthing of newborn animals occurs. To facilitate easy handling and to provide durable construction, the incubator has a support frame that protects the components against damage during transportation. The incubator generally comprises a generally cylindrical container with an opening to allow insertion and removal of a newborn animal, and a heat exchanger mounted in the container. The heat exchanger houses a fan which continually circulates air over a heater core and into the container. With the use of quick release couplings at the ends of supply and return hoses, the heater core connects to the engine coolant system of an automobile. The incubator also connects to the automobile electrical system by way of a conventional male-female plug of the type used for trailer hitches. A temperature control system also is provided by the electrical connection of a thermostat to a control valve. The control valve opens and closes to regulate the flow of engine coolant to the heater core as the thermostat regulates the supply of electrical current to the control valve.

18 Claims, 6 Drawing Sheets

NEWBORN ANIMAL INCUBATOR FOR USE IN CONJUNCTION WITH AN AUTOMOBILE

BACKGROUND OF THE INVENTION

1. Field of the Invention

The present invention relates to an apparatus for drying newborn animals. More particularly, the present invention relates to an incubator for drying newborn animals that acquires its heat and electricity, respectively, from the engine coolant system and electrical system of an automobile to which it is coupled.

2. Description of the Prior Art

For newborn animals, the first few hours following birth are a critical time period. In the cattle industry, the calving process occurs in the winter or early spring months, a time of the year when the weather conditions are least hospitable to newborn calves. During inclement weather it is especially critical for the coat of the newborn calf to dry quickly. Normally the mother cow will assist the calf by cleaning its coat. If, however, the mother cannot assist the calf because its wet coat has frozen, the newborn calf may encounter hyperthermia and, ultimately, death. For a more thorough description of the calving process, the dangers to newborn calves, and the potential loss to ranchers, readers are directed to the discussion in the Background of the Invention for U.S. Pat. No. 5,140,947, which issued to Robert C. Bruce on Aug. 25, 1994.

To increase the likelihood that newborn calves will survive beyond the first few critical hours following birth, ranchers have developed numerous strategies. U.S. Pat. No. 4,567,853, which issued to Dave A. Hayden on Feb. 4, 1986, discloses a carrier apparatus disposed for towing newborn animals. Such a device may be used, for example, to tow a newborn calf away from the field where it was born and into a protective shelter where the rancher may better be able to assist the calf.

Another method for increasing the likelihood of survival for the newborn calf involves an artificially hastened drying of the calf's coat. The above-noted U.S. Pat. No. 5,140,947 discloses a newborn animal incubator that utilizes a drying container connected by a plurality of vents and external ducts to a forced air heater, which may be powered by either electricity or propane. While the '947 device provides an excellent remedy to reduce the attrition rate of newborn calves, it fails to alleviate several other problems. If the apparatus is powered by an electrical connection to a wall outlet in a barn or other structure, then there still exists a problem of bringing the calf to the incubator. If, however, the apparatus is to be brought into the field where birthing occurs, then several other difficulties exist. First, if it is heated by propane, then it will be necessary to haul separate propane tanks into the field. Second, the apparatus contains its heating elements and vents on the exterior of the container where they are susceptible to breakage or damage. Third, as a bulky, box-like container, the apparatus is not easily handled.

Other prior art incubators disclose various methods for delivering warmed air to the interior of the incubator container. U.S. Pat. No. 1,628,139, which issued to Jean V. Giesler on May, 10, 1947, discloses an incubator that uses water to supply heat to the incubator, with a thermostat controlled valve regulating the flow of water.

U.S. Pat. No. 1,509,569, which issued to Harold L. Watson on Aug. 5, 1944, discloses a heating system for incubators which also uses a fluid medium such as water.

U.S. Pat. No. 4,637,343, which issued to Herbert W. Beck and Ronald L. Franken on Jan. 20, 1987, discloses a brooder unit and system utilizing a liquid medium that passes through a heat exchanger of the type having a plurality of heat-exchange fins, and a fan that blows air over the heat exchanger to warm air traveling to the interior compartment of the brooder unit.

U.S. Pat. No. 3,683,512, which issued to Harvey J. Beam on Aug. 15, 1972, discloses a pet drying apparatus that utilizes a fan to force air over an electric heating element for the purpose, of supplying warm air through several ducts to a separate container.

U.S. Pat. No. 3,175,534, which issued to Robert E. Pollard on Mar. 30, 1965, discloses a pet drying apparatus that utilizes a fan to force air over an electric heating element for the purpose of delivering warm air through a plurality of vents, regulated by air-flow control means, to the interior compartment of a container.

U.S. Pat. No. 4,559,903, which issued to Phyllis R. Bloom and Perry O. Sherrard on Dec. 24, 1985, discloses a pet drying apparatus that utilizes a fan to force air over an electric heating element for the purpose of delivering warm air through a plurality of vents to the interior compartment of a container.

U.S. Pat. No. 4,314,410, which issued to Margaret W. Nichols on Feb. 9, 1982, discloses a pet drying apparatus that moves forced warm air from a blower through one or more conduits to an outer shell, which then allows the warm air slowly to flow through a plurality of vents into the open container where a pet is placed.

One problem with incubators that use an electrical heating element to warm the air, however, is that they may heat the direct airflow to temperatures capable of causing harm to the newborn animal. While not all of the above-listed electrically heated blowers or incubators may suffer from this problem, it is a matter of concern, particularly where the animal is confined in a relatively small space.

None of the above inventions and patents, taken either singly or in combination, is seen to describe the instant invention as claimed.

SUMMARY OF THE INVENTION

The newborn animal incubator of the present invention is designed to operate in conjunction with from the electrical and engine coolant systems of an automobile. The electrical system of the automobile is linked to the electrical system of the incubator by means of a conventional connector of the type normally used, for example, with hitched trailers and the like. The engine coolant system of the automobile is plumbed to the heat exchanger of the incubator using supply and return hosing connected with hydraulic quick release couplings.

To facilitate easy transportation of the incubator to the field where birthing occurs, the incubator has an external metal frame for both handling the incubator and protecting the components against damage. When brought into the field, the incubator simply needs to be plumbed into the engine coolant system by using the quick release couplings, and then plugged into the electrical system of the automobile. With the simple set-up process, the apparatus may be utilized on short notice.

While the temperature inside the incubator container remains below a set thermostat level, the hot engine coolant travels from the automobile to the incubator where it passes into the heat exchanger. At the heat exchanger, air is forced by an electrically powered fan over a conventional fluid-heated radiator of the type having a plurality of aligned heat-exchange fins connected to a central pipe. Through conduction and convection, thermal energy transfers from the engine coolant passing through the heater core to the air circulating inside the incubator container.

As the temperature inside the incubator container rises above the thermostat setting, the thermostat breaks the electrical connection to a thermostat control valve to halt the flow of engine coolant to the heater core. While the flow of engine coolant is stopped, the fan continues to circulate the warm air inside the incubator container to promote drying of the newborn's coat. When the temperature inside the incubator container again drops below the thermostat setting, the thermostat control valve is again energized to allow engine coolant to pass into the heater core. The cycle continues as long as the incubator remains connected to the electrical system and engine coolant system of an automobile. When the coat of the newborn is completely dry, a rancher may return the newborn calf to its mother so that it may begin suckling.

Accordingly, it is a principal object of the invention to provide an incubator for newborn animals which is heated entirely from the free energy released during operation of an automobile engine.

It is another object of the invention to provide an incubator for newborn animals which is easily portable and can be brought to the place where animal birthing occurs so that a distressed newborn animal may receive immediate assistance.

It is a further object of the invention to provide an incubator for newborn animals which provides warm air that cannot possibly burn or scorch the hair or skin of the newborn animal.

Yet another object of the invention is to provide a novel heating system for a portable newborn animal incubator that may easily be set up for operation without requiring a substantial amount of time.

Still another object of the invention is to provide a novel incubator that is particularly well suited for use with the birthing of newborn farm animals during inclement weather.

An additional object of the invention is to provide a novel incubator that is constructed of light-weight and durable materials, which particularly suit the device for its use in the calving process.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Referring now to the figures by numerals of reference, and first to FIGS. 2–4, 10 denotes generally a newborn animal incubator of the present invention. The incubator 10 comprises a generally cylindrical incubating container 12 mounted on a welded metal stand or frame 14. Container 12 preferably is formed from a length of 36-inch culvert pipe (typically used in heavy construction projects), which has spaced circumferential ribs. The 36-inch culvert pipe is preferred because of its durable construction and its ability to withstanding extreme temperature conditions, i.e., it will not become too brittle during the cold of winter.

Figure 3:
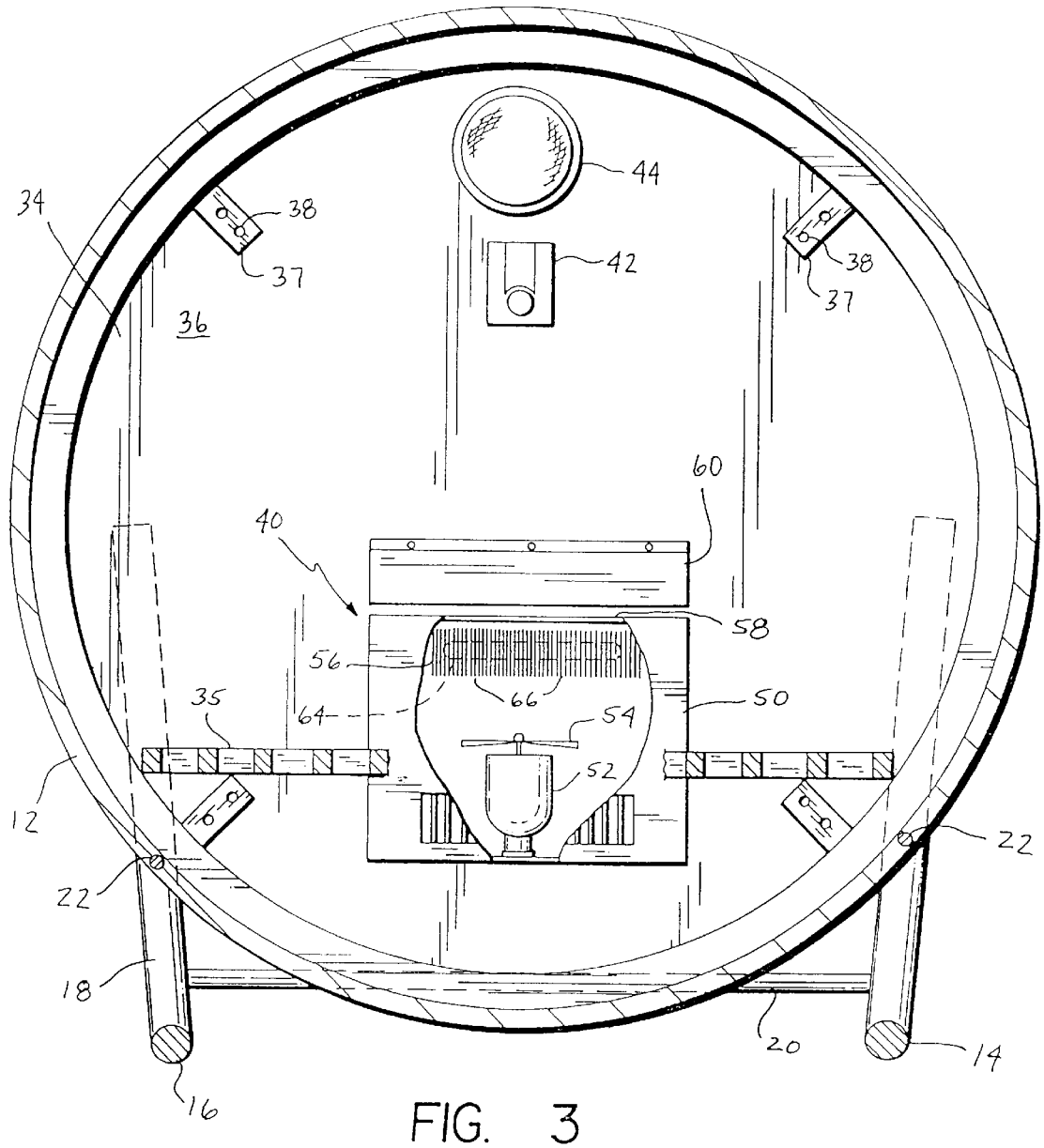
FIG. 3 is a cross sectional view according to line 3—3 in FIG. 2, with a portion of the heat exchanger broken away to expose the internal components.
Figure 4:
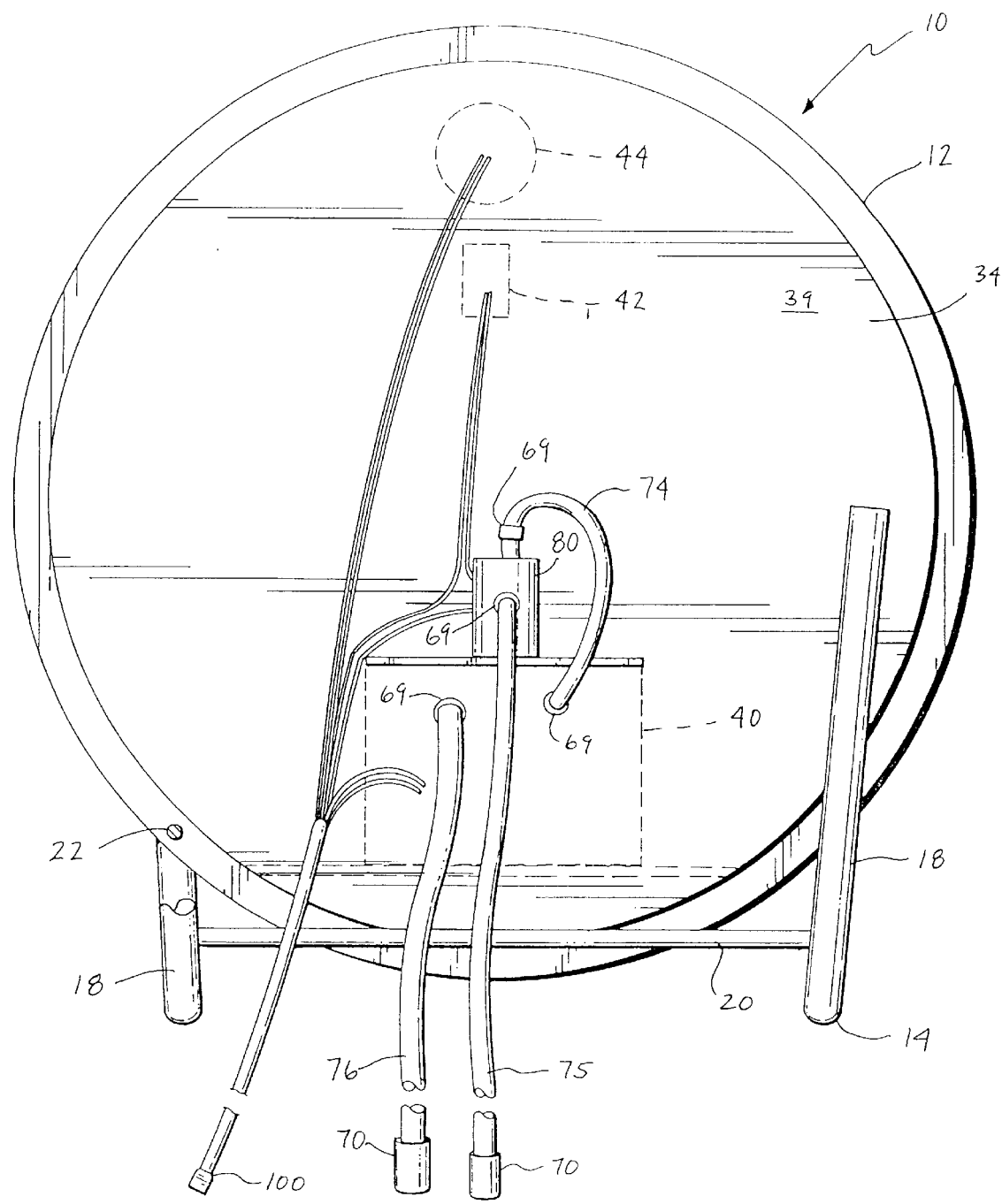
FIG. 4 is an end view of the incubator showing the hydraulic coupling system and the temperature control valve, as well as the electrical connections between the various components, and a portion of the carrying frame is broken away to expose the connection between the container and the frame.

Frame 14 has a pair of opposed runners 16 that extend beyond the length of container 12. At both ends of each runner 16 is an upwardly extending portion 18 that projects slightly outwardly and angularly away from container 12. A pair of lateral support members 20, one of which is shown in FIG. 3, connect and space apart runners 16 adjacent either end of container 12. Frame 14 supports container 12 on a pair of welded longitudinal support members 22. Longitudinal support members 22 pass through a series of linearly aligned bores (not shown), which extend through the ribs of container 12. Thus, container 12 physically is attached to frame 14 as each longitudinal support members 22 extends between the upwardly extending portions 18 of a single runner 16.

Container 12 has a body or barrel 30 with opposed end walls 32 and 34. Resting inside the barrel 30 of container 12 is a grate 35, which extends between end wall 32 and end wall 34. Grate 35 allows air to circulate throughout container 12, and also provides a floor upon which a newborn may sit or stand while enclosed within the incubator 10. As illustrated in FIG. 3, end wall 34 is secured to the barrel 30 by a plurality of brackets 37 with machine screws 38. Although not shown, end wall 32 is similarly secured to barrel 30. It should be noted, however, that there is no need for a tight seal between barrel 30 and end walls 32 and 34, and that any other means may also be used to accomplish the same.

Mounted to inside surface 36 of end wall 34 are a heat exchanger 40, a thermostat 42, and a light 44. Heat exchanger 40 has an outer casing 50 secured to the inside surface 36 of end wall 34. Grate 35 is notched to accommodate the presence of casing 50. Anchored to the floor of casing 50 is an electric motor 52, which has a fan blade 54 attached to the end of its driven shaft. Fan blade 54 lies in close proximity to the heater core 56 to provide a flow of air over the same when the incubator 10 is in operation. At the top of casing 50 is an opening 58 that allows air to enter the heat exchanger 40 for passage over heater core 56. As illustrated in FIG. 3, casing 50 has an air vent 57 in the side facing end wall 32. Air vent 57, which provides an outlet for air to exit heat exchanger 40, is positioned beneath grate 35. By forcing warm air beneath grate 35, warm air circulates from beneath the newborn calf and rises turbulently upwardly for quick drying of the newborn's coat. While the casing 50 has been described to have a single air vent 57, it should be apparent to one skilled in the art that the casing 50 may also be provided with a plurality of air vents 57 to expel the warm air.

To prevent the newborn calf from urinating or defecating into heat exchanger 40, a protective cover 60 is secured to the inside surface 36 of end wall 34 above heat exchanger 40 and in confronting relation to opening 58. Cover 60 slopes downwardly from the inside surface 36 of end wall 34 to cause any urine or fecal matter to slide off cover 60 and onto or through grate 35. The presence of cover 60 does not inhibit air flow, because air may flow around the sides of cover 60 for passage through opening 58.

Heater core 56 comprises a conventional fluid-heated radiator of the type having a plurality of aligned heat-exchange fins 66 attached to a central pipe 64 through which a fluid medium may pass. The central pipe 64 communicates at its inlet and at its outlet, through end wall 34, with fittings 68. Fittings 68 extend outwardly from end wall 34 and are disposed to receive a hose connected to the fittings 68 by hose clamps 69 of conventional design. The hose clamps 69 are used to connect the ends of relay hose 74, supply hose 75, and return hose 76 to heat exchanger 40 or temperature control valve 80.

Temperature control valve 80 is mounted to the shelf 82 located on the external surface 39 of end wall 34. Supply hose 75 carries engine coolant from the automobile engine coolant system 90 to the inlet of temperature control valve 80. Control valve 80 is disposed for reciprocating between an open and closed position depending upon its energized state, as discussed hereinafter. While temperature control valve 80 remains in its open position, the hot engine coolant passes through relay hose 74 into heater core 40 for the transfer of thermal energy from the liquid coolant to the air. The cooled engine coolant then passes directly back to engine coolant system 90 via return hose 76. However, when temperature control valve 80 remains in its closed position, no engine coolant will move between the automobile engine coolant system 90 and heater core 40. Thus, temperature control valve 80 assists in regulating the temperature inside container 12 by controlling the flow of engine coolant from engine coolant system 90 to heat exchanger 40.

Figure 6:
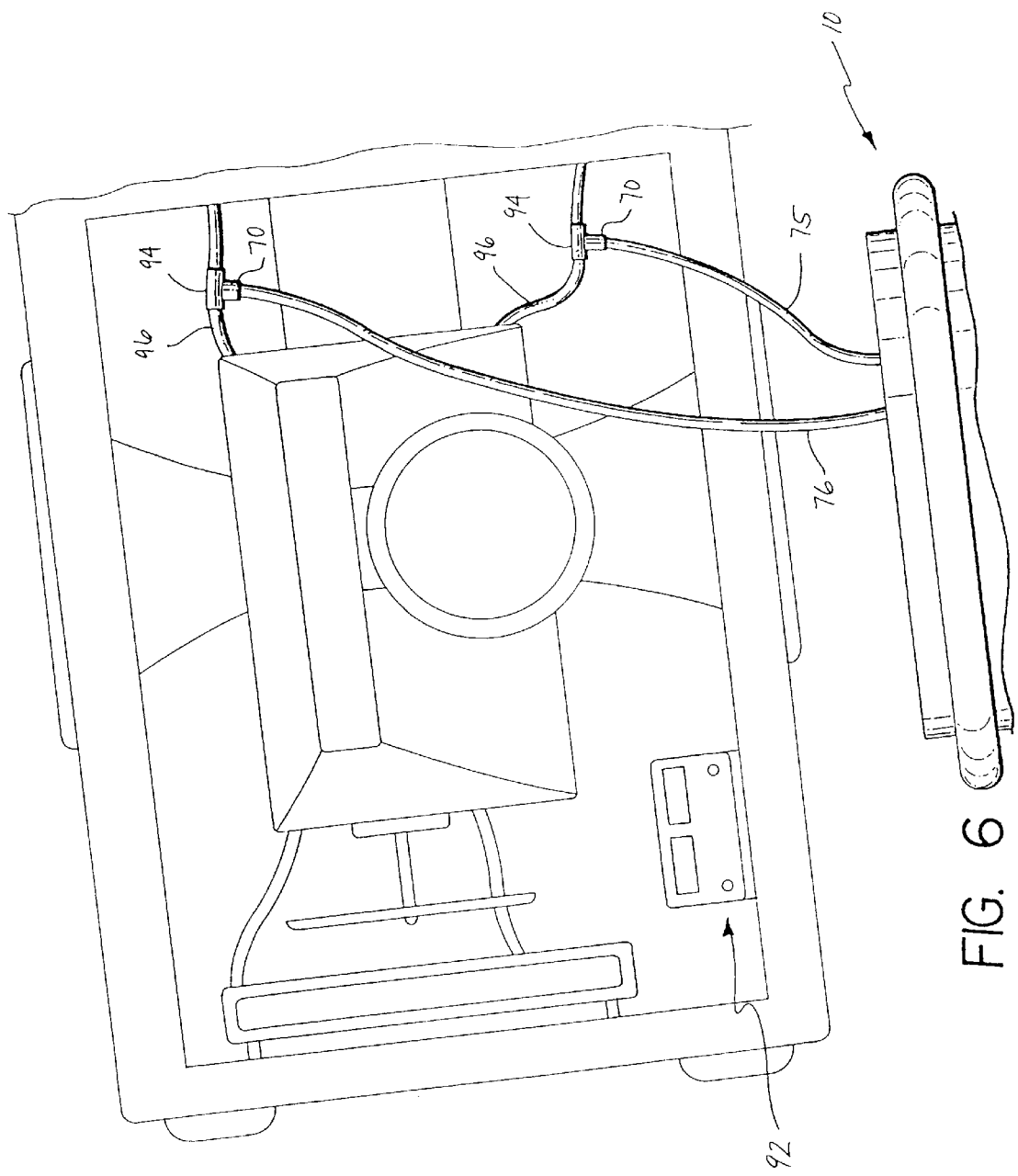
FIG. 6 is a perspective view from above an automobile engine, showing the hydraulic connection between the engine coolant system of an automobile and the incubator of the present invention.

FIG. 6 illustrates how the supply hose 75 and return hose 76 connect to the automobile engine coolant system 90, which generally comprises an automobile heater core connected to the automobile engine. Hoses 96 connecting between the automobile engine and the automobile heater core transport coolant within the engine coolant system 90. The hoses 96 must be modified by the addition of T-fittings 94 to which conventional hydraulic quick-release couplings 70 on supply and outlet hoses 75 and 76, respectively, may be attached. Once couplings 70 are attached to the fittings 94, incubator 10 becomes integrated into the engine coolant system 90. Heat generated as a by-product of the operating automobile engine is carried away from the engine by the liquid coolant. Heated coolant leaves the engine at approximately 190° F., and the heat retained by the coolant is utilized to warm the incubator 10. In this way, no additional energy source is necessary to supply heat for incubator 10. Rather than discharging the heat directly Lo the automobile passenger compartment or to the outside air, the heated engine coolant is instead used to provide a clean source for warming incubator 10.

Figure 5:
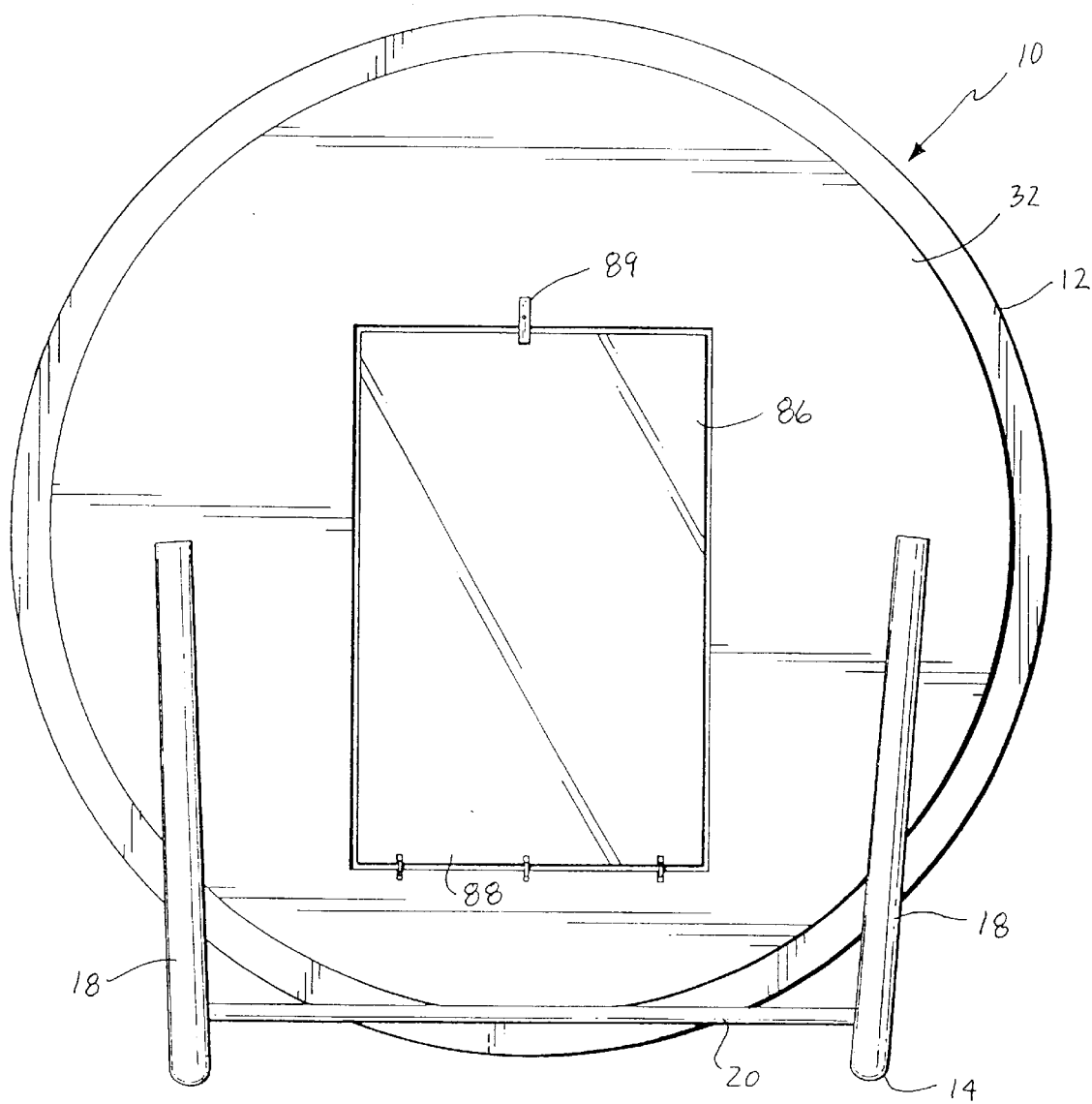
FIG. 5 is an end view of the incubator showing the hinged door covering the opening through which a newborn animal is placed into and removed from the incubator.

Referring now to FIG. 5, the end wall 32 is shown attached to container 12. End wall 32 has therein a central, rectangular opening (not shown) that a rancher may selectively cover with door 86. Door 86 is generally rectangular in shape and is disposed to cover the rectangular opening (not shown) in end wall 32. Door 86 hingedly is connected to end wall 32 at its lower edge 88, such that the door may open downwardly to allow a rancher to place a newborn calf into or remove a newborn calf from incubator 10. Door 86 may be retained in its upright or closed position by the latch 89.

Figure 1:
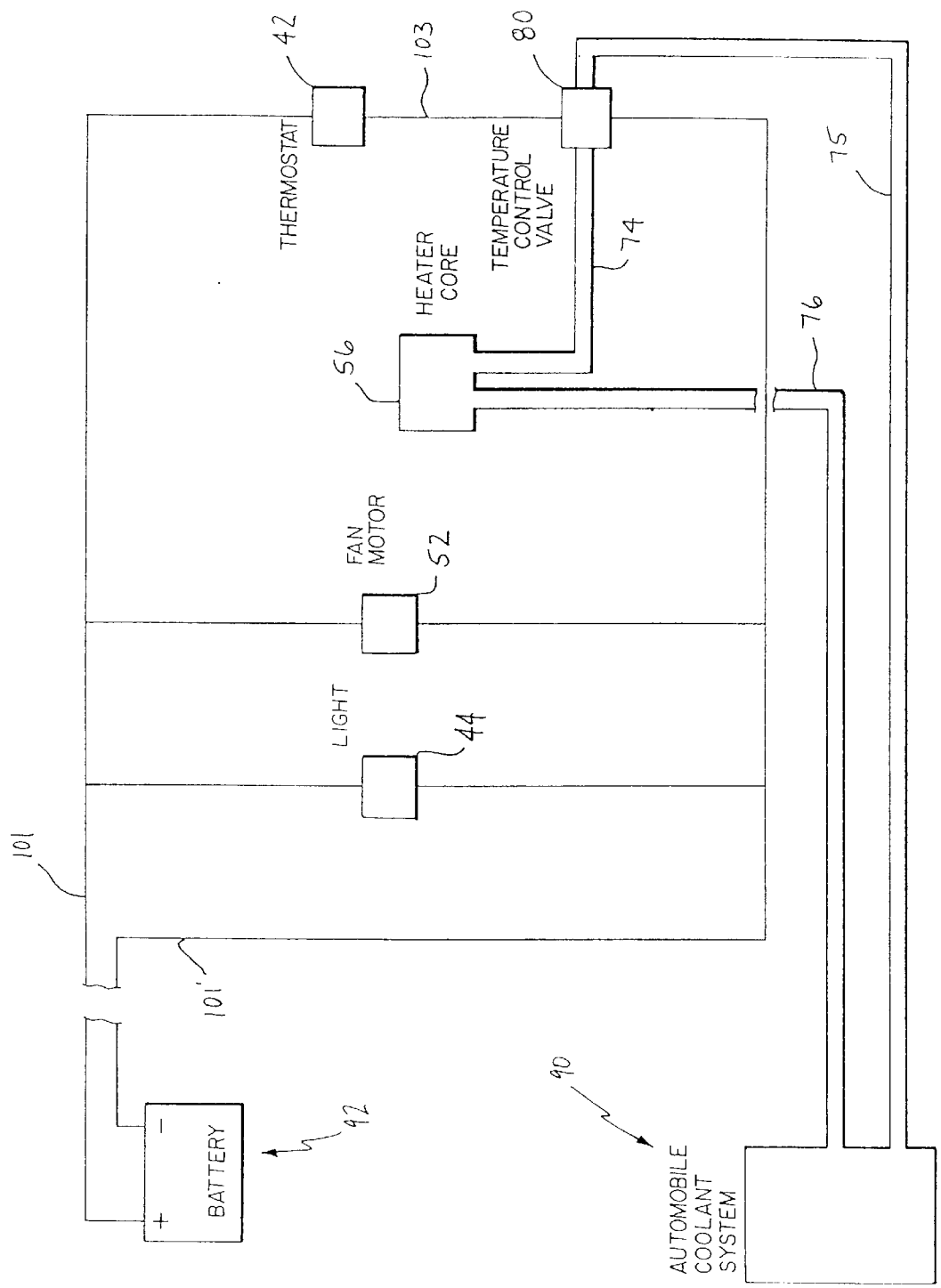
FIG. 1 is a schematic of the electrical system and the heating system for the incubator according to the present invention.
Figure 2:
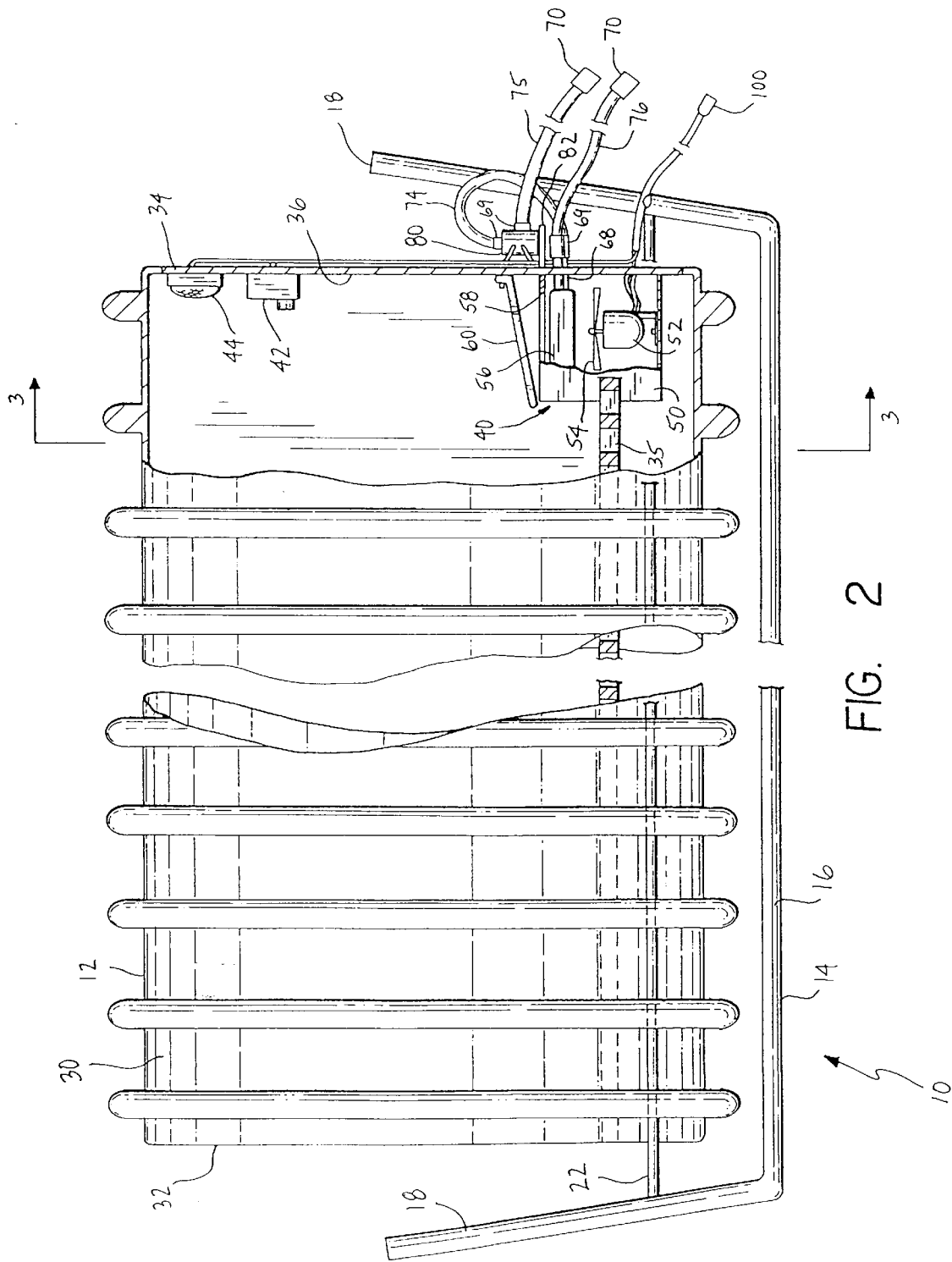
FIG. 2 is a side elevational view of the incubator according to the present invention, with a portion of the container broken away to expose the grate and the heat exchanger, portions of which also are broken away to expose the motorized fan and the heat-exchange fins.

The electrical system of the incubator 10 is coupled to the automobile electrical system 92 by a conventional male/female plug 100 of the type typically found, for example, in use with hitched trailers and the like. Referring now to the schematic diagram of FIG. 1, the incubator receives current through electrical lines 101 and 101', which are connected to the automobile electrical system via male/female plug 100. Connected in parallel along lines 101 and 101' are the electric motor 52, the light 44, and the thermostat 42 and control valve 80. Because the light 44 and motor 52 are in parallel with the thermostat 42 and control valve 80, the light 44 and motor 52 constantly operate while current is received from automobile electrical system 92, for example, while plug 100 remains connected.

Thermostat 42 and temperature control valve 80 are connected together by electrical line 103. When the temperature inside container 12 rises above the temperature setting of thermostat 42, the thermostat interrupts the connection along electrical line 103 and prevents control valve 80 from receiving an electrical current. Alternatively, the thermostat 42 maintains the electrical connection along line 103 while the temperature in container 12 remains below the temperature setting of thermostat 42. Thus, whether control valve 80 is energized to its open state depends upon the setting of thermostat 42. When the temperature in container 12 is higher than the setting of thermostat 42, the thermostat causes the control valve 80 to close. As previously mentioned, the closing of the control valve 80 interrupts the flow of hot engine coolant to heat exchanger 40. When the temperature in container 12 remains below the setting of thermostat 42, a constant supply of electrical current allows the valve to remain in its open position, thereby supplying the heat exchanger 40 with a constant supply of hot engine coolant.

In use, an incubator of the present invention is intended to be taken directly into the field where calf birthing occurs. Before arriving into the field, a rancher will already have coupled relay hose 74, supply hose 75, and outlet house 76 to the appropriate fittings 68 (as discussed above) on temperature control valve 80 and heat exchanger 40. Upon arrival into the field, the rancher will then proceed to couple the hoses 75 and 76 (using hydraulic quick release couplings 70) to the appropriate T-fittings 94 on the hoses 96 of automobile engine coolant system 90. Finally, the electrical system of incubator 10 must be linked to automobile electrical system 92 by connecting plug 100 to its appropriate mate on the automobile. Once incubator 10 receives an electrical current from the automobile, the light 44 and fan motor 52 will continue to operate until the electrical current to incubator 10 is broken.

In the event an individual calf requires additional assistance to ensure its survival, a rancher must insert the calf through the opening in end 32 and place the calf onto grate 35 where it may sit or, when able, stand. After the rancher places the calf inside container 12, the rancher may secure door 86 in its closed position. With power already supplied to the incubator 10, the incubator will be operational. Thus, the calf should be introduced to an already warmed incubator. Preferably the thermostat will be set to approximately 90° Fahrenheit (32° C.), which optimally will dry the coat of the newborn calf without causing the animal to overheat.

For purposes of disclosure, it may be assumed that the thermostat is set to a temperature of 90° F. When a rancher places the newborn calf into the incubator 10, the temperature inside the container 12 likely will fall below the thermostat setting (90° F.) When this happens the control valve will be in its open position and hot engine coolant will pass through the heat exchanger 40. The hot engine coolant passing through the heater core 56 will warm the heat-exchange fins 66 by conduction. Drawing air through heater core 56 causes fins 66 to warm, by convection, the air flowing over their surface. The cooled engine coolant returns to automobile engine coolant system 90 where it will again be heated by the operating automobile engine.

The warmed air leaves heater core 40 through vent 57, which directs the warmed air outwardly below grate 35 where the newborn calf is seated. Because warm air rises, the warm air forced through vent 57 will create turbulent air flow inside container 12 as the warm air rises upwardly through grate 35 and around the calf. This results in efficient warming and drying of the calf. Air inside container 12 is recycled through opening 58 and into heat exchanger 40 for repeated cycles of heating.

Eventually the temperature inside the container 12 will rise above the level set for thermostat 42 (90° F.). As the temperature rises above the thermostat setting, thermostat 42 causes temperature control valve 80 to close, which ceases the supply of hot engine coolant to heat exchanger 40. While the flow of engine coolant is stopped, the fan motor 52 continues to turn fan blade 54 for continued circulation of the air inside container 12. When the temperature inside the container 12 falls below the thermostat setting (90° F.), thermostat 42 causes control valve 80 to open, which resumes the flow of engine coolant from the automobile to the heat exchanger 40 and back to the automobile. The process continues while incubator remains connected to an operating automobile. When the newborn calf has a dry coat and can sustain its own body temperature, a rancher may remove the calf from the incubator and return the calf to its mother where it may begin suckling.

While this invention has been described with its temperature control system regulating the flow of engine coolant from the automobile to the heat exchanger 40, it should be apparent to those skilled in the art that the same mechanism may instead be used to regulate the flow of engine coolant from the heat exchanger 40 to the automobile. Regardless of its positioning with respect to the direction of engine coolant flow, the temperature control system will alternately allow or halt the flow of engine coolant to the heat exchanger 40 of the incubator 10.

While this invention also has been described with its heat exchanger 40 located inside container 12, it should be apparent to those skilled in the art that the heat exchanger 40 could also be located outside container 12. However, if such a design modification were used, it would be necessary to protect heat exchanger 40 from rain, snow, and the like.

It is to be understood that the present invention is not limited to the sole embodiment described above, but encompasses any and all embodiments within the scope of the following claims.

I claim:

1. An apparatus for warming and drying a newborn animal, comprising:

a container having one wall defining an opening for allowing placement of the newborn animal into said container and removal of the newborn animal from said container;

means for covering said opening on said container, said means for covering being operable upon manipulation to expose said opening and to cover said opening;

a source of a liquid medium, wherein said source is the engine coolant system of an automobile;

a heat exchanger having a hydraulic inlet for receiving said liquid medium and a hydraulic outlet for discharging said liquid medium, and an air inlet for receiving air from the interior of said container and an air outlet for discharging air into the interior of said container; and hydraulic connection means communicating between said hydraulic inlet and hydraulic outlet of said heat exchanger, and said source for said liquid medium.

2. The apparatus according to claim 1, wherein said container is generally cylindrically shaped, and said heat exchanger is located at one end of said container, and said opening is located in the other end of said container.

3. The apparatus according to claim 1, wherein said means for covering said opening comprises:

a door hingedly connected to said container for movement about the hinge between a first position where said opening is exposed and a second position where said opening is covered; and means for releasably securing said door in said second position.

4. The apparatus according to claim 1, wherein said heat exchanger is mounted on said container with said air inlet and said air outlet communicating with the inside of said container.

5. The apparatus according to claim 4, wherein said heat exchanger is mounted on the inside of said container, said hydraulic inlet being attached to an inlet fitting and said hydraulic outlet being attached an outlet fitting, said inlet and outlet fittings extending between the inside of said container and the outside of said container for coupling to said hydraulic connection means.

6. The apparatus according to claim 1, wherein said heat exchanger comprises:

a heater core located between said air inlet and said air outlet, said heater core having a conduit for carrying said liquid medium between said hydraulic inlet and said hydraulic outlet, and a plurality of spaced radiating fins connected to said central conduit for conducting heat away from said liquid medium;

an electrically powered fan located between said air inlet and said heater core, said fan forcing the flow of air over said heater core for exchanging heat from said radiating fins to the flow of air; and means for connecting said fan to an electrical power source.

7. The apparatus according to claim 1, wherein said liquid medium is antifreeze.

8. The apparatus according to claim 1, wherein said hydraulic connection means comprises:

a supply hose coupled at one end thereof to said source of said liquid medium and at the other end thereof to said heat exchanger; and a return hose coupled at one end thereof to said source of said liquid medium and at the other end thereof to said heat exchanger.

9. The apparatus according to claim 8, wherein said hydraulic connection means further comprises temperature control means for regulating the temperature inside said container.

10. The apparatus according to claim 9, wherein said temperature control means comprises:

a temperature control valve located intermediate the ends of said supply hose, said temperature control valve reciprocating between an open position and a closed position to regulate the flow of said liquid medium to said heat exchanger;

a thermostat having adjustment means for selecting a desirable temperature for the inside of said container, said thermostat regulating the supply of electrical current to said temperature control valve for reciprocation of said temperature control valve between said open position and said closed position; and means for connecting said thermostat to an electrical power source.

11. The apparatus according to claim 10, wherein said temperature control valve is in said open position when the temperature inside said container is lower than the setting of said thermostat, and said temperature control valve is in said closed position when the temperature inside said container is higher than the setting of said thermostat.

12. The apparatus according to claim 1, further comprising:

a light secured to the inside of said container for illuminating the inside of said container; and means for connecting said light to an electrical power source.

13. The apparatus according to claim 1, further comprising a grate member seated inside said container and elevated from the floor of said container to provide circulating air flow above and below the newborn animal placed on said grate member.

14. The apparatus according to claim 1, further comprising a metal frame for contacting the ground and providing support to said container.

15. An apparatus for drying newborn animals that has an electrical connection to the electrical system of an automobile and a hydraulic connection to the engine coolant system of an automobile, the apparatus comprising:

(a) a container having a releasably securable door for allowing placement of the newborn animal into said container and removal of the newborn animal from said container;

(b) a heat exchanger having an air inlet for receiving air from the inside of said container and an air outlet for discharging air to the inside of said container, comprising:

(1) a heater core located between said air inlet and said air outlet, said heater core having a hydraulic inlet and a hydraulic outlet, a conduit for carrying a liquid medium between said hydraulic inlet and said hydraulic outlet, and a plurality of spaced radiating fins connected to said conduit for conducting heat away from said liquid medium; and (2) a fan connected to the electrical system of the automobile, said fan being located between said air inlet and said heater core for forcing air over said heater core and through said air outlet; and (c) hydraulic connection means communicating between said hydraulic inlet and hydraulic outlet of said heater core, and the engine coolant system of the automobile.

16. The apparatus according to claim 15, wherein said hydraulic connection means comprises:

a supply hose coupled at one end thereof to the engine coolant system of the automobile and at the other end thereof to said heater core; and a return hose coupled at one end thereof to the engine coolant system of the automobile and at the other end thereof to said heater core.

17. The apparatus according to claim 16, further comprising temperature control means for regulating the temperature inside said container.

18. The apparatus according to claim 17, wherein said temperature control means comprises:

a temperature control valve located intermediate said ends of said supply hose, said temperature control valve reciprocating between an open position and a closed position to regulate the flow of the engine coolant to said heater core;

a thermostat having adjustment means for selecting a desirable temperature for the inside of said container, said thermostat being connected to the automobile electrical system and regulating the supply of electrical current to said temperature control valve for reciprocation of said temperature control valve between said open position and said closed position.

\* \* \* \* \*